(12) United States Patent
Schenk (10) Patent No.: US 8,559,292 B2
(45) Date of Patent: Oct. 15, 2013

(54) DETERMINING OF COUPLING COEFFICIENTS IN A VECTOR TRANSMISSION SYSTEM

(75) Inventor: Heinrich Schenk, Munich (DE)

(73) Assignee: Lantiq Deutschland GmbH, Neubiberg (DE)

(*) Notice: Subject to any disclaimer, the term of this patent is extended or adjusted under 35 U.S.C. 154(b) by 1151 days.

(21) Appl. No.: 11/856,068

(22) Filed: Sep. 17, 2007

(65) Prior Publication Data

US 2009/0073867 A1    Mar. 19, 2009

(51) Int. Cl.
*H04J 1/12*    (2006.01)

(52) U.S. Cl.
USPC ........... 370/201; 370/210; 370/329; 370/503; 375/260; 375/346

(58) Field of Classification Search
USPC ......................................................... 370/286
See application file for complete search history.

(56) References Cited

U.S. PATENT DOCUMENTS

| | | | | |
|---|---|---|---|---|
| 5,732,113 A * | 3/1998 | Schmidl et al. | ............... | 375/355 |
| 6,055,297 A * | 4/2000 | Terry | ........................... | 379/1.01 |
| 2003/0086362 A1* | 5/2003 | Hasegawa et al. | ............ | 370/201 |
| 2005/0008083 A1* | 1/2005 | Miyoshi et al. | ................ | 375/259 |
| 2006/0197704 A1* | 9/2006 | Luzzatto et al. | ............... | 342/458 |
| 2006/0251183 A1* | 11/2006 | Soffer | ........................... | 375/267 |
| 2009/0175160 A1* | 7/2009 | Iraji et al. | ....................... | 370/208 |

OTHER PUBLICATIONS

Sigrud Schelstraete, Ed Eckert G.vdsl2: Crosstalk channel estimation with improved convergence, Source1: Ikanos Communications, Study group 15, Temporary Document NC-082 ITU Standardization Sector, Apr. 2007, pp. 7.

Markus Ek, Frank Sjöberg, Mehdi Mohseni G.vdsl: Using orthogonal pilot sequences for assisting FEXT channel estimation in vector transmission Source1: Upzide Labs AB, ASSIA Inc. Study group 15, Temporary document SD-036 ITU Standardization Sector, Jan. 2007, pp. 4.

Very high speed digital subscriber line transceivers 2 (VDSL2), chapter 1, p. 1-2, chapter 10.2 (encl. Fig. 10-2), p. 63, chapter 10.5.1, p. 84 Series G: Transmission systems and media, digital systems and networks, Digital sections and digital line systems—Access networks, ITU-T Standardization Sector, G.993.2, Feb. 2006, pp. 1, 2, 63 and 84.

Peter Silverman Second Letter Ballot Draft of the DSM Technical Report, chapter 4 (General Information), 13-15, Source*: Editor DMS Technical Report, Project: 50, Dynamic Spectral Management, NIPP-NAI-2006-188, NIPP-NAI, Nashville, TN, Feb. 2007.

* cited by examiner

*Primary Examiner* — Chi Pham
*Assistant Examiner* — Shick Hom
(74) *Attorney, Agent, or Firm* — SpryIP, LLC (57) ABSTRACT

Embodiments related to determining of coupling coefficients in a Vector transmission system are described and depicted.

11 Claims, 10 Drawing Sheets

DETERMINING OF COUPLING COEFFICIENTS IN A VECTOR TRANSMISSION SYSTEM

BACKGROUND

Vector transmission systems are widely used in communication systems and become more and more important for providing high throughput data transmission. Vector transmission systems can be regarded as a MIMO (multiple input multiple output) system where data are transmitted from multiple transmitters over multiple independent channels to multiple receivers.

For example, the DSL (digital subscriber line) transmission according to VDSL (very high bit rate DSL) uses a vector transmission system for transmitting data over a plurality of subscriber lines. According to the VDSL standard, a frequency bandwidth of up to 30 MHz is divided into non-overlapping frequency bands for upstream and downstream communication. Crosscoupling at the near end, which is referred to NEXT (near end cross coupling) data signals is eliminated or reduced in such systems because of the separation of the frequency bands for upstream and downstream. The FEXT crosscoupling (far end cross coupling) which is the crosscoupling of signals at the far end resulting from a coupling of data signals transferred in a same direction on different lines may however reduce a data throughput due to the increased line coupling at higher bandwidth and lower length of the lines.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may be assigned with the same reference number.

Figure 1A:
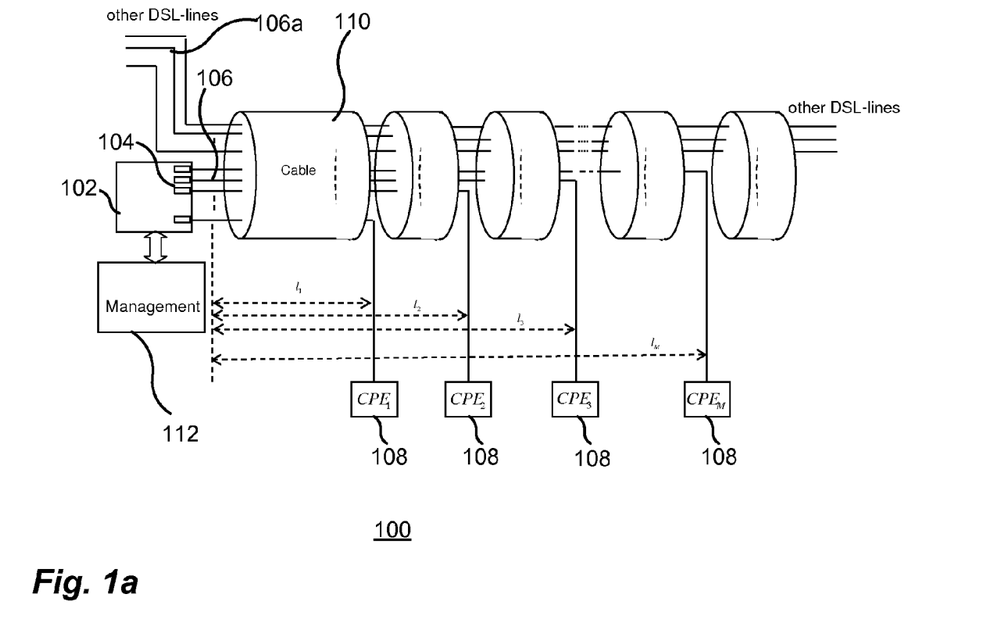
FIGS. 1a and 1b show schematic diagrams according to an embodiment of the present invention.

Referring now to FIG. 1a, an exemplary embodiment of a vector transmission system 100 is shown. In the following detailed description, exemplary embodiments are described with respect to a VDSL vector transmission system. It is to be noted however that the VDSL vector transmission system is only an exemplary embodiment of a vector transmission system and that vector transmission system 100 can be of any other type. Furthermore, it is to be understood that the lines of the VDSL vector transmission system are only one representation of channels of a vector transmission system and that the described VDSL lines may be replaced in other embodiments by other channels.

The VDSL vector transmission system comprises a DSLAM (Digital Subscriber Line Access Multiplexer) 102 having a plurality of first transceiver units 104 which are coupled to a plurality of lines 106. Each of the lines of the plurality of lines may for example be implemented as twisted pair wire. DSLAM 102 may be implemented in an Optical Network Unit (ONU) such as a Central Office (CO), a cabinet, an exchange or other types of network termination devices at the operator's end.

Each of the plurality of lines 106 connects the first transceiver units 104 at the operator's end with a respective second transceiver unit 108 at a subscriber end. The first transceiver units 104 are implemented to form with the second transceiver units 108 and lines 106 a vector transmission system. The second transceiver units 108 may for example be integrated in a costumer premise equipment (CPE) such as a home gateway, a router etc. The second transceiver units 108 may be located at different distances with respect to the transceiver units 104 such that the number of lines provided in a cable bundle or cable 110 is decreasing with increasing distance from the first transceiver units 108 as shown in FIG. 1a. It is however to be noted that the second transceiver units 108 may in other embodiments have a same or nearly a same distance from the first transceiver units.

At the operator's side, a management entity 112 may be provided to provide management functions such as spectrum management. As will be described later, the management entity 112 may perform also coordination functionality for transmitting FEXT/line coupling training signals.

Further lines, for example ADSL lines, SDSL lines or ISDN lines, which are designated in FIG. 1a with reference number 106a may be provided in the cable 110. As shown in FIG. 1a, the further lines 106a may terminate at other operator or subscriber termination locations. For example, the VDSL line may be terminated at a cabinet while the ADSL lines may be terminated at a Central Office. According to other embodiments of the present invention, all of the lines provided in the cable 110 may be connected to the first transceiver units. In such embodiments, all of the lines of the cable may be transmission lines of the vector transmission system while in the embodiment shown in FIG. 1a, only the lines connected to the first transceiver units 104 may be transmission lines of the vector transmission system.

Distortion of the data transmission on the vector transmission system occurs mainly by two types: distortions which are generated by the vector transmission itself also known as FEXT or self-FEXT and distortions from outside of the vector transmission system also known as alien noise.

While the alien noise typically can not be compensated, the FEXT distortions of the vector transmission system can be compensated by having knowledge of the signals, i.e. of the data transmitted over the lines of the vector transmission system.

In upstream direction all of the data send over the lines 106 terminate at one of the first transceiver units 104 of DSLAM 102. Therefore, at the receiver side, i.e. at the DSLAM, access to all data transmitted over the lines 106 can be provided.

In downstream direction, the data send over the lines 106 are received at the respective second transceiver units 108 which are typically placed at different locations. Typically, no channel between the receiving devices at the different subscriber locations is available. In this case, compensation at the subscriber's end can not be provided as the transceiver unit 108 at one subscriber has no information of the data send to the transceiver unit 108 at another subscriber.

Compensation of the FEXT can be achieved in this case by using a technique known as precompensation. In precompensation, which is also known as preceding or precancellation, the effect of crosstalk experienced by a signal during transmission is computed or estimated prior to transmitting the signal and the signal is modified based on this information for example by subtracting the calculated crosstalk from the transmission signal or adding the negation of the calculated crosstalk. Then, during the transmission, the transmission signal is exposed to the crosstalk, i.e. the crosstalk adds to the transmission signal resulting in the receiving of the original or nearly original, i.e. unmodified or nearly unmodified signal as provided at the transmitting side except of some other noise added during the transmission.

It is to be noted that the term FEXT compensation as used herein may include both the FEXT compensation at the receiver side as described above as well as to the FEXT precompensation at the transmitter side as described above.

Figure 1B:
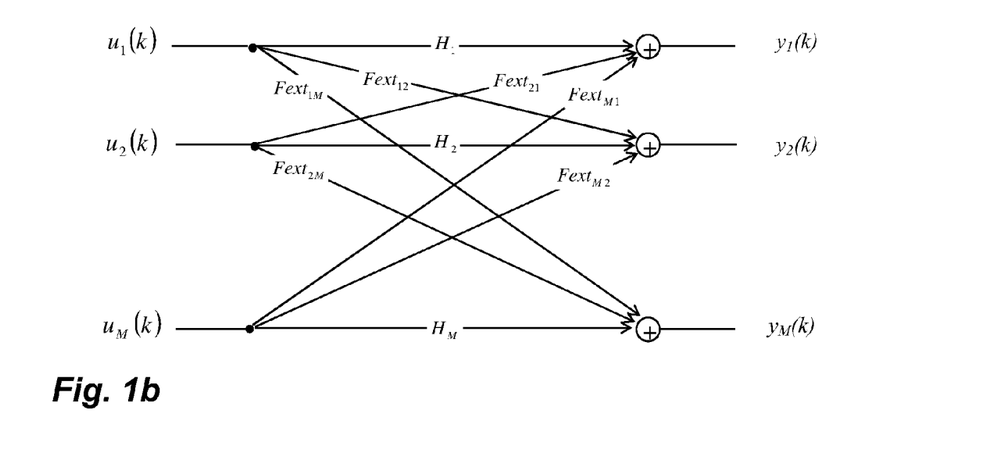

In VDSL, a data transmission system using DMT (discrete multitone transmission) is used. Each of the frequency bands provided for data transmission is divided into a plurality of non-overlapping subcarriers (tones). Furthermore, the coordinated transmission in a vector transmission system allows FEXT compensation to be provided independently for each of the subcarrier. A model showing the crosscouplings for one of the plurality of subcarriers in a vector transmission system is shown in FIG. 1b. While FIG. 1b shows the model for one subcarrier, it is to be noted that the model can be applied to each other subcarrier.

For each subcarrier, the transmission can be described by a MIMO (Multiple In Multiple Out) system. The transmission system may be represented by a plurality of partial transmission functions. Line transmission functions $H_i$ which are also known as line coupling coefficients define the attenuation and distortion due to the line characteristics of line i. FEXT transmission functions $FEXT_{i,j} j \neq i$ define the FEXT coupling from line i to line j. The coefficients $FEXT_{i,j}$ are also known as FEXT coupling coefficients. As can be seen from the above, for calculating FEXT (pre)compensation the coefficients $FEXT_{i,j}$ for the respective subcarriers have to be determined.

According to the above model, the transmission matrix A(k) for a subcarrier k with M transmission lines is formed now by $$A(k) = \begin{bmatrix} H_1(k) & Fext_{12}(k) & Fext_{13}(k) & \ldots & Fext_{1M}(k) \\ Fext_{21}(k) & H_2(k) & Fext_{23}(k) & \ldots & Fext_{2M}(k) \\ Fext_{31}(k) & Fext_{32}(k) & H_3(k) & \ldots & Fext_{3M}(k) \\ \vdots & \vdots & \vdots & & \vdots \\ Fext_{M1}(k) & Fext_{M2}(k) & Fext_{M3}(k) & \ldots & H_M(k) \end{bmatrix}$$

A sender vector $u(k)=(u_1, u_2, \ldots u_M)$ transmitted by the plurality of transceiver units of the system is received at the plurality of transceiver units at the other end as receive vector $y(k)=(y_1, y_2, \ldots y_M)$. According to the above model, the receive vector y(k) can be calculated by $y(k)=u(k)\cdot A(k)+\delta$ (eq. 1) where $\delta$ represents a noise introduced during transmission.

In order to provide FEXT compensation, the coefficients of matrix A(k) have to be determined. This is accomplished according to embodiments of the present invention by transmitting a training signal from the plurality of transceiver units 104 to the plurality of transceiver units 108 or from the plurality of transceiver units 108 to the plurality of transceiver units 104. Each transceiver unit 104 or 108 measures the signal received. As will be described in more detail below, the coefficients of Matrix A(k) are then determined from the measured receive signal. It is to be noted that according to embodiments of the present invention, the training signal for determining coefficients of a subcarrier k is transmitted on the subcarrier k at a given time instance or time slot over only one of the plurality of lines of the system while all other lines of the plurality of lines transmit no power on the subcarrier k during the transmitting of the training signal over line i.

Figure 2:
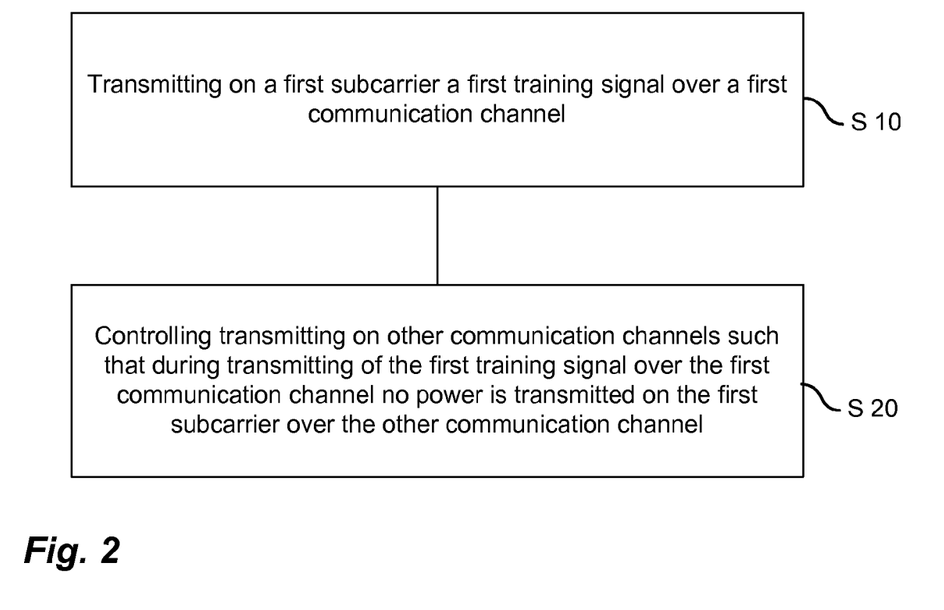
FIG. 2 shows a diagram according to an embodiment of the present invention.

FIG. 2 shows an exemplary operation to determine the FEXT/line coupling coefficients for a vector transmission system. In S-10, a first FEXT training signal is transmitted on a first subcarrier over a first channel of a plurality of channels of the vector transmission system. In S-20, transmitting on other channels of the plurality of channels is controlled such that during transmitting the first FEXT training signal over the first channel no power is transmitted on the first subcarrier over the other channels of the vector transmission system. It is to be noted that the FEXT training signal as used herein refers to a signal which may be used for determining FEXT coupling coefficients as well as line coupling coefficients.

Figure 3:
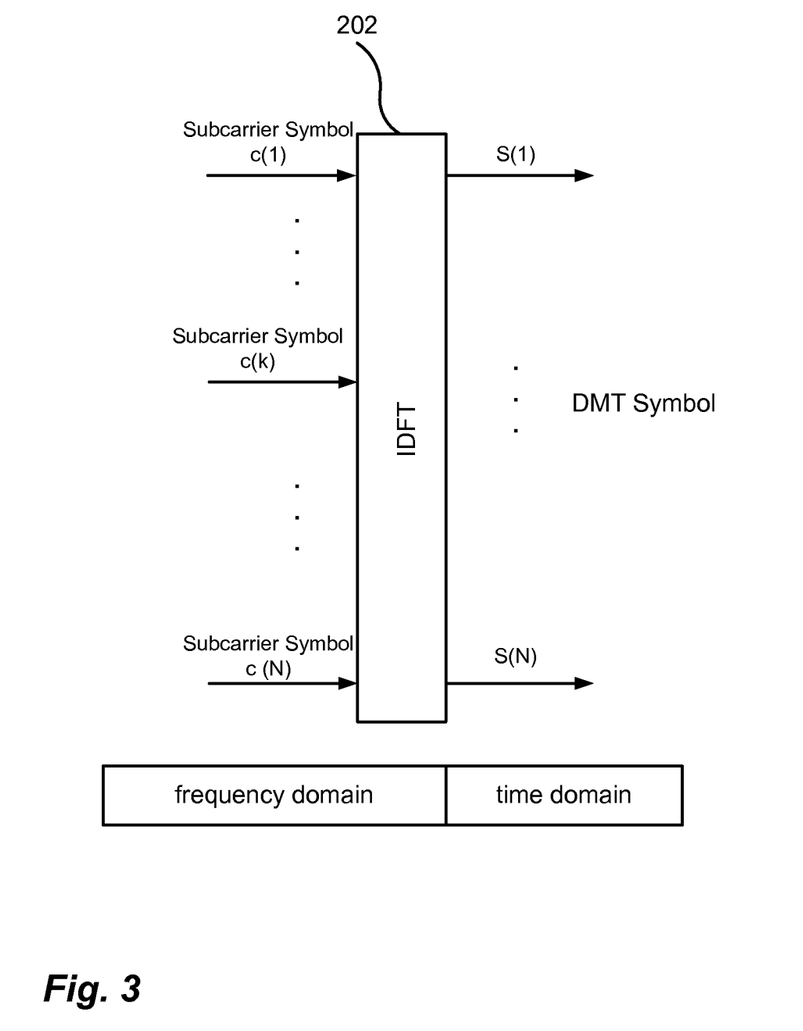
FIG. 3 shows a frequency-time conversion entity according to an embodiment of the present invention.

For each subcarrier only one line is then actively transmitting a training signal while all other lines are quiet. In a DMT vector transmission system this may be achieved by transmitting on subcarrier k a training vector $u_{training}(k)=(0\ 0\ \ldots\ c(k),\ \ldots\ 0\ 0)$ where c(k) is a non-zero subcarrier symbol (subcarrier training symbol) modulated on line i while all other lines are modulating on subcarrier k a zero subcarrier symbol. A subcarrier symbol is a complex or non-complex number which is modulated on the respective subcarrier by using a frequency-time conversion such as an IDFT (inverse discrete Fourier transformation). The subcarrier symbol can also be regarded as a point in a vector space. In discrete multitone transmission (DMT), each subcarrier symbol to be modulated on the subcarrier is provided to a respective input of the frequency-time conversion (IDFT-Block) in order to generate a DMT symbol by converting the plurality of subcarrier symbols to a plurality of time representations. FIG. 3 shows a frequency-time conversion as may be implemented in each of the transceiver units 104 and 108. A frequency-time conversion entity 202 receives at each input a subcarrier symbol associated with a respective subcarrier. The frequency-time conversion entity 202 converts the plurality of subcarriers symbols into a plurality time representations S(1) ... S(N−1) which may be followed by the insertion of a cyclic extension and other operations to generate a DMT symbol which is then transmitted over the line coupled to the respective transceiver.

For transmitting user data, the subcarrier symbol to be transmitted is one constellation point of a group of constellation points representing the bit or bitsequence to be transmitted over the subcarrier. Each constellation point represents a particular bit or bit sequence and the subcarrier symbol modulated on the subcarrier therefore represents the bit or bitsequence associated with the constellation point.

For determining the coupling coefficients of Matrix A(k), the training subcarrier symbol c(k) modulated on the subcarrier may be any non-zero subcarrier symbol. According to one embodiment, the training subcarrier symbols transmitted in the training signals is different from each constellation point of constellation diagrams used for transmitting user data.

The training subcarrier symbol c(k) may according to one embodiment be selected from a group of predetermined symbols such as the group of complex numbers 1, −1, j, −j where the symbol j represents the imaginary units is known to a person skilled in the art. In one embodiment, the subcarrier symbol c(k) may be selected from a group of 4-QAM symbols. Selection of one of these complex numbers which are referred in the following as unit subcarrier symbols allows a calculation of the FEXT coefficients with reduced calculation effort as will be explained in the following. However, it is to be noted that in other embodiments subcarrier symbols other than unit subcarrier symbols may be used.

By providing the training vector signal $u_{training}(k)=$ (0 0 ... c(k), ... 0 0) to the plurality of lines, the vector signal $y_{training}(k)$ received at the plurality of receiver units is obtained according to the above model by $$yT_{training}(k) = \begin{bmatrix} Fext_{i,1} \cdot c(k) \\ Fext_{i,2} \cdot c(k) \\ \vdots \\ Fext_{i,i-1} \cdot c(k) \\ H_i \cdot c(k) \\ Fext_{i,i+1} \cdot c(k) \\ \vdots \\ Fext_{i,M} \cdot c(k) \end{bmatrix} + \begin{bmatrix} \delta_1 \\ \delta_2 \\ \vdots \\ \delta_{i-1} \\ \delta_i \\ \delta_{i+1} \\ \vdots \\ \delta_M \end{bmatrix}$$

where T represents the transposed vector.

If c(k) is selected for example to be 1, the received training vector is obtained to be the ith row of Matrix A(k) distorted by the noise vector which corresponds to the alien noise on subcarrier k. It is to be noted that in this case no further computing is necessary in order to determine the coefficients allowing an easy and cost-saving implementation. Furthermore, computing efficiency is also achieved when selecting other unit subcarrier symbols as will become apparent below.

$$yT_{training}(k) = \begin{bmatrix} Fext_{i,1} \\ Fext_{i,2} \\ \vdots \\ Fext_{i,i-1} \\ H_i \\ Fext_{i,i+1} \\ \vdots \\ Fext_{i,M} \end{bmatrix} + \begin{bmatrix} \delta_1 \\ \delta_2 \\ \vdots \\ \delta_{i-1} \\ \delta_i \\ \delta_{i+1} \\ \vdots \\ \delta_M \end{bmatrix}.$$

The noise can be reduced or eliminated by repeatedly sending the training vector and averaging over the measured signals. Averaging over 2 symbols reduces the noise by 3 dB, averaging over 4 symbols reduces the noise by 6 dB, and averaging over $2^x$ symbols reduces the noise by 3×dB.

While until now only one subcarrier has been considered, it is to be noted that the training signal may be transmitted for all subcarriers concurrently. Concurrent transmission of the training signals for all subcarriers may according to embodiments include assigning of the plurality of subcarriers to different lines such that at least two lines are transmitting concurrently training signals on different subcarriers. Furthermore, as will be described later, according to other embodiments all of the subcarriers may be transmitted over one line while the other lines are quiet on all subcarriers.

To avoid loss of synchronicity for the respective line connections, the vector transmission system may use pilot tones for each line at one common carrier frequency. The coupling coefficients may then be estimated from coupling coefficients of subcarriers close or near the carrier frequency of the pilot tone.

In the following, an embodiment will be described wherein DMT-Symbols for determining the coupling coefficients are generated such that each line of the vector transmission system transmits approximately the same power. According to this embodiment, each of the available subcarriers is assigned to one line such that each line has assigned about an equal number of subcarriers, i.e. the number of subcarriers assigned to a respective line is not differing by more than one for all lines.

Since only one line is allowed to transmit a non-zero training subcarrier symbol for each subcarrier, the assignment of each subcarrier to one respective line indicates that the assigned line is allowed to transmit a non-zero training subcarrier symbol for this subcarrier. Or in other words, the assignment indicates that the respective subcarrier is an active subcarrier for transmitting training signals on the respective line. A DMT symbol is generated for each respective line by modulating each subcarrier assigned to the respective line with a non-zero subcarrier symbol. Subcarriers which are not assigned to the respective line are modulated with a zero subcarrier symbol, i.e. are modulated with 0.

Assignment information may be provided for example as an assignment matrix indicating to which line each subcarrier is assigned to. Or in other words, the assignment matrix indicates for each line which subcarriers are active for transmitting the training signal and which are quiet. As mentioned above, a subcarrier can be active only for one line while the subcarrier is quiet for all other lines. The assignment information may further indicate which non-zero subcarrier symbol is to be modulated on the respective active subcarrier.

Figure 4A:
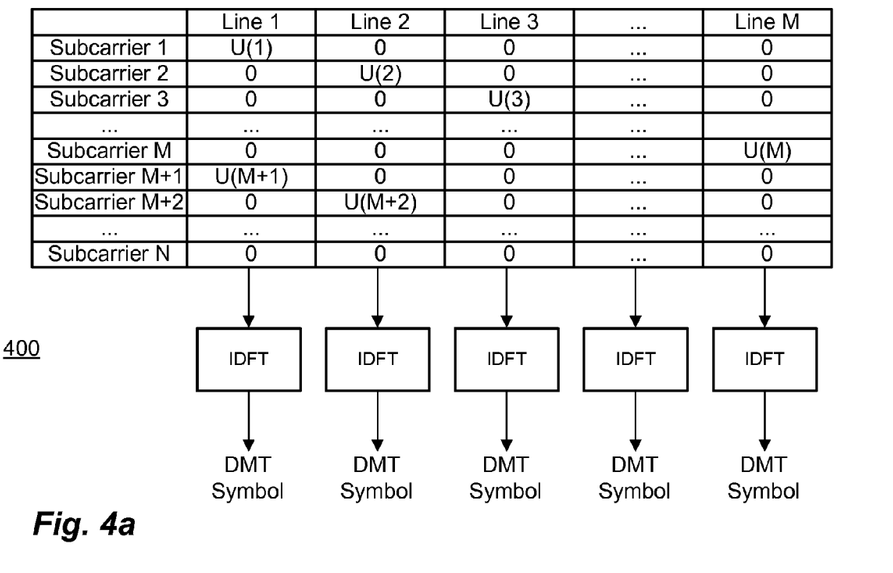
FIGS. 4a and 4b show assignment matrixes according to embodiments of the present invention.

FIG. 4a shows an exemplary assignment matrix 400. As can be seen in FIG. 4a, subcarrier 1 is assigned to line 1 and the subcarrier symbol to be modulated is U(1). U(1) is a variable representing one of the unit subcarrier symbols 1, −1, j, −j. As can be seen, all other lines are not assigned to transmit power on subcarrier 1 and therefore modulate a zero on this subcarrier. Subcarrier 2 modulates subcarrier symbol U(2) and is assigned to line 2 while all other lines modulate a zero subcarrier symbol. In general, the subcarriers are assigned in subsequent manner to all M lines. After M subcarriers have been assigned to all M lines, the assignment starts again at line 1, i.e. subcarrier M+1 is assigned to line 1 etc. While in matrix 400 a subsequent assignment is used, it is to be noted that any other assignment which assigns the subcarriers equally among the lines may be used in other embodiments. Furthermore, as described above, each of the subcarrier symbols U(n) may represent one of the plurality of unit symbols 1, −1, j, −j or one of any other groups of symbols for example one of a group of 4-QAM symbols. In embodiments, the sequence {U(n)}=U(1), U(2), U(3), ... U(N) is generated according to a predetermined scheme. The sequence {U(n)} may be a random or pseudo random sequence of the plurality of unit symbols and may be stored in look-up tables or other information.

As shown in FIG. 4a, for each of the lines a DMT symbol is generated based on the assigned subcarriers by transferring the respective subcarrier symbols to the frequency-time conversion for modulating each subcarrier according to the subcarrier symbols provided in the assignment matrix.

In order to determine all coupling coefficients, the assignment is variable. Assignments are repeatedly varied until each subcarrier is assigned at least once to each line. Thus, each subcarrier may be repeatedly assigned to one line different from a previously assigned line and respective DMT symbols are repeatedly generated by modulating the subcarrier currently assigned to the respective line with a non-zero subcarrier symbol and modulating the subcarriers currently not assigned with the respective different line with a zero subcarrier symbol as described above.

Figure 5:
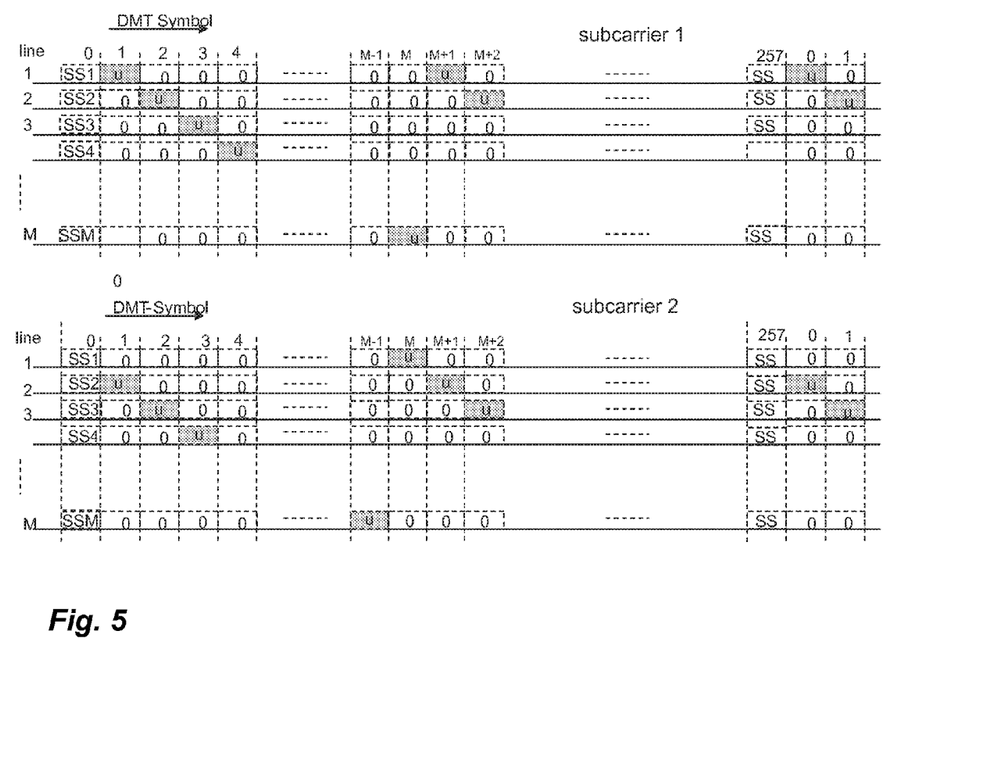
FIG. 5 shows an illustration of the transmission of training signals for multiple lines according to an embodiment of the present invention.

FIG. 5 illustrates an example of varied assignments for a VDSL vector transmission system. FIG. 5 shows a time sequence of the symbols modulated on subcarrier 1 and subcarrier 2 for the plurality of lines. The DMT symbols are transferred in a group which is known in the art as superframe. Each superframe comprises a plurality of 256 data DMT symbols and one synchronization symbol referenced in FIG. 5 by SS. Transmission on each line is coordinated such that synchronization symbols SS1 . . . SSM are transmitted simultaneously in time slot 0 over the plurality of lines. However, it is to be noted that the lines may be coordinated in other embodiments in a different way such that the synchronization symbols SS1 . . . SSM are not concurrently transmitted.

Referring now to time slot 1 of FIG. 5, the first subcarrier is assigned to line 1, subcarrier 2 is assigned to line 2 etc. It is to be noted that this assignment corresponds to the assignment indicated by the matrix of FIG. 4a. In the next time slot, the assignment is varied such that each subcarrier is shifted by one. Thus, subcarrier 1 is assigned to line 2, subcarrier 2 is assigned to line 3 etc. In the next time slot 3, the subcarriers are again shifted such that subcarrier 1 is assigned to line 3, subcarrier 2 is assigned to line 4 etc. The shifting of the subcarriers in the assignment is repeated until each of the subcarriers have been assigned to each line in time slot M. Thus, at time slot M, each of the coupling coefficients has been measured once by the respective transceiver unit 104 or 108 receiving the training signals. In order to average over multiple measurements for each coupling coefficient, the above described repetitive assignment may be repeated multiple times as shown in FIG. 5.

Figure 6:
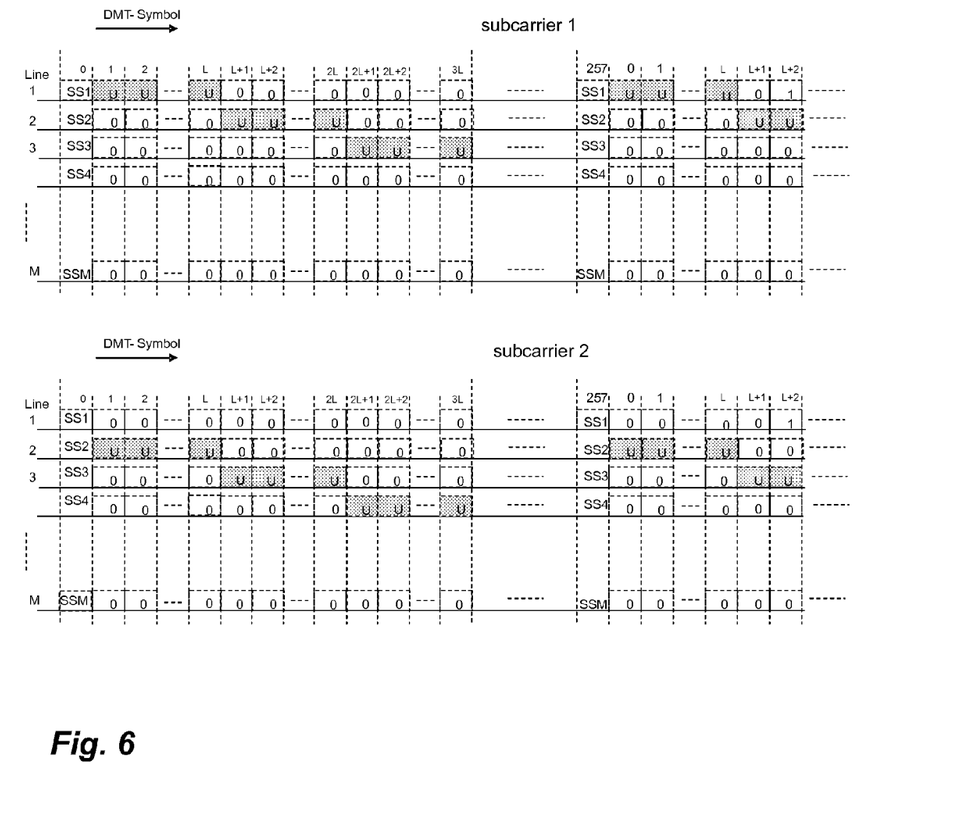
FIG. 6 shows an illustration of the transmission of training signals for multiple lines according to another embodiment of the present invention.

While the above embodiment describes one example of varying the assignment in order to determine all coupling coefficients, it is to be noted that in other embodiments other schemes may be used. FIG. 6 shows one example where each respective assignment is repeated L times for averaging over L measurements before the assignment is varied and again repeated L times etc.

The above described embodiments of FIGS. 5 and 6 may for example be used for training coupling coefficients at a start-up of the vector transmission system.

Other embodiments of the present invention may be used to determine coupling coefficients when a new data connection is activated while the existing lines (old lines) are transmitting user data, i.e. a new line joins the vector transmission system. Such a situation may for example arise when a user starts to establish an internet connection while other users are already transmitting user data. The terms "existing lines" and "new line" are therefore not referring to the physical existence of these lines but to whether they have already joined operation within the vector transmission system or not.

While for the existing M lines the determined FEXT coupling coefficients allow for a smooth operation due to FEXT (pre)compensation with eliminated or reduced FEXT interference, the joining of a new line (data channel) within the same cable would results in distortions when the FEXT couplings of the new line to the existing lines would not be taken into consideration. Thus, the new coupling coefficients for the system extended to M+1 lines are needed for FEXT compensation to allow smooth operation of the extended vector transmission system.

Figure 7:
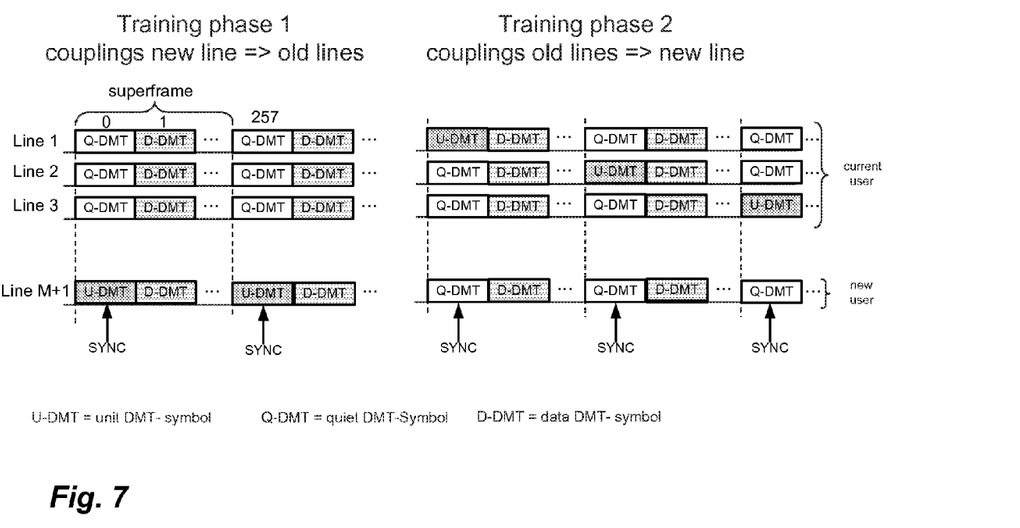
FIG. 7 shows an illustration of the transmission of training signals for multiple lines according to further embodiment of the present invention.

Referring to FIG. 7, one embodiment for determining coupling coefficients when a new user joins the vector transmission system will now be described. The embodiment allows determining of the coupling coefficient without disturbing the data transfer on the lines. According to this embodiment, the training phase for determining the coupling coefficients is divided into two phase. In a first training phase, the FEXT coupling coefficients related to the influence of the new line to the existing lines are determined. If the new line is assigned to line M+1, these coefficients correspond to $\text{Fext}_{M+1,1}$, $\text{Fext}_{M+1,2} \ldots \text{Fext}_{M+1,M}$. In a second training phase, the FEXT coupling coefficients related to the influence of the existing lines to the new line are determined. These coefficients correspond to $\text{Fext}_{1,M+1}$, $\text{Fext}_{2,M+1} \ldots \text{Fext}_{M,M+1}$.

According to the embodiment shown in FIG. 7, the training signals are transmitted during the synchronization time slot of a superframe. The training signals therefore represent synchronization symbols (SYNC Symbols) during the training phase. As will become more apparent in the following, the transmitting of the training symbols during the synchronization time slot allows to determine the coupling coefficients without reducing the data throughput of the system. Furthermore the new line can transmit during the synchronization time slot with normal power without disturbing data transmission on the existing lines.

Figure 4B:
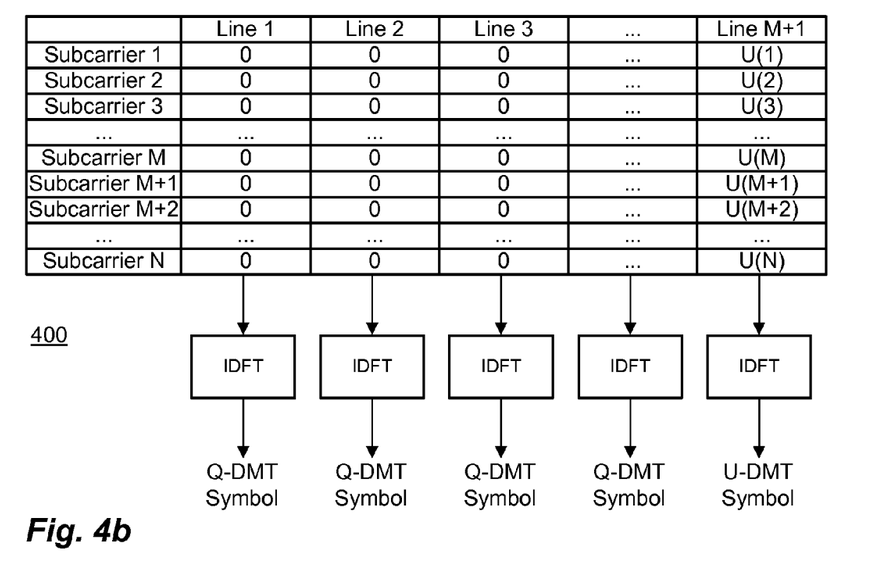

In the first training phase, only the newly joined line M+1 transmits training signals during the synchronization time slot of each superframe while all other lines are quiet. As shown in FIG. 7, the training signal transmitted on line M+1 is a DMT-symbol such that all subcarrier transmit a unit subcarrier symbol. Such a DMT-symbol will be referred in the following as unit DMT-symbol and is designated in FIG. 7 as U-DMT. The corresponding assignment is shown in FIG. 4b. FIG. 4b shows an assignment matrix where each subcarrier is assigned to line M+1. In embodiments, the unit symbols modulated on the unit DMT-symbol may be different, for example such that the subcarrier symbols form a predetermined or pseudo random sequence or form other distributions based on the unit subcarrier symbol set $(1, -1, j, -j)$. Since all of the subcarriers are transmitted over the new line, all existing lines, i.e. lines 1 to M are modulating zeros for all subcarriers. The DMT symbol generated by modulating only zero is referred in the following as a quiet DMT-symbol and corresponds to transmitting no power over the corresponding line. The quiet DMT-symbol is designated in FIG. 7 as Q-DMT. It is to be noted that the unit DMT symbol may be regarded as a SYNC symbol for the new line and the quiet DMT symbol may be regarded as a SYNC symbol for the existing lines since both are transmitted during the time synchronization time slot. Information regarding the SYNC symbol may be provided to each receiver in order to allow correct determining of the SYNC symbol.

After transmitting the unit DMT symbol or the quiet DMT symbol in the synchronization time slot 0 over the respective lines, each of the lines transmits user data or other data by transmitting data DMT symbols in other time slots of the superframe. In one or more next superframes, the new line may again transmit the unit DMT symbol in order to allow averaging over multiple measurements of the respective coupling coefficient.

In the second training phase, the new line is transmitting only quiet DMT symbols while the old lines are alternately transmitting training signals during the time synchronization time slot. As shown in FIG. 7, the new lines may transmit training signals by subsequently transmitting unit DMT-symbols during the synchronization time slot. As shown in FIG. 7, line 1 transmits the unit DMT symbol in the synchronization time slot of the first superframe, line 2 transmits the unit DMT symbol in the synchronization time slot of the next superframe etc. The subsequent transmitting of the unit DMT symbol is repeated until all lines have transmitted the unit DMT symbol. Then, the overall sequence can be repeated in order to allow averaging over multiple measurements. As outlined above, information may be provided to each receiver to indicate which SYNC symbol, i.e. a unit DMT symbol or a quiet DMT symbol, is valid for each superframe transmitted.

While in the embodiment of FIG. 7 a subsequent transmission of the unit DMT symbol by each of the existing lines is shown, it is to be understood that the order in which the existing lines transmit the unit symbol may include any other sequence.

Furthermore, while in the embodiment of FIG. 7 the unit DMT symbols are transmitted only in the time synchronization slot of the superframes, a unit DMT symbol may in other embodiments of the present invention be transmitted in one or more of the data time slots of a superframe which are otherwise used for transmitting user data. According to one embodiment, the unit DMT symbols may be transmitted only in the data time slots while in the synchronization time slot synchronization SYNC symbols other than the unit DMT symbols may be transmitted. According to another embodiment, the unit DMT symbols may be transmitted in the data time slots in addition to transmitting the unit DMT symbols in the synchronization time slot. This allows an increased rate of transmitting training signals and may for example be used when many repetitions of training signals are required due to strong alien noise. The usage of the mode with only the synchronization time slot or the mode with both, the synchronization time slot and one or more data time slots may be variable and may be dependent on parameters such as alien noise etc.

Furthermore, while in FIG. 7 the coupling from the new line to the existing lines is determined in the first trainings phase prior to determining the coupling from the existing lines to the new lines in the second training phase, it is to be noted that in other embodiments the coupling of the existing lines to the new line may be determined prior to determining the coupling of the new line to the existing lines.

It is further to be noted that in the training phase for determining the coupling coefficient of the coupling of the existing lines to the new lines (second trainings phase in FIG. 7), DMT symbols other than the unit DMT symbols may be transmitted. For example, the assignments of the subcarrier symbols as described with respect to FIGS. 4a, 5 and 6 may be used in order to concurrently transmit in the time synchronization slot for each line training signals on different subcarriers.

Figure 8A:
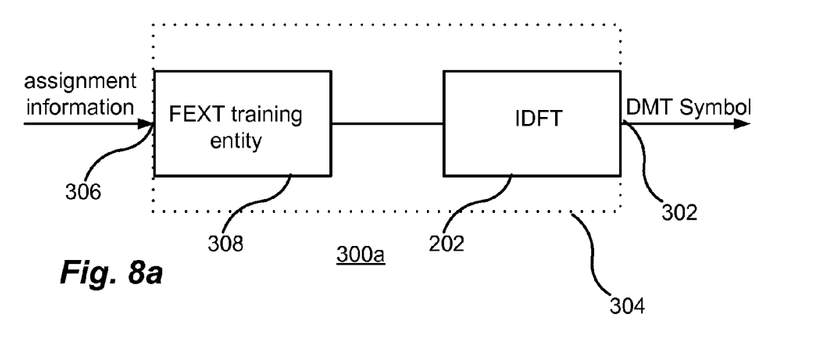
FIGS. 8a and 8b show a transmitter device according to an embodiment of the present invention.

FIG. 8a shows a transmitter device 300a of a transceiver unit implementing the above described embodiments. The transmitter device comprises an output 302 to transmit a coupling coefficient training signal over a line and a modulation entity 304 which is operable to generate the coupling coefficient training signal by selectively modulating a non-zero subcarrier symbol or a zero subcarrier symbol on each subcarrier of the plurality of subcarriers. The modulation entity 304 may comprise an input 306 to receive information indicating subcarriers to be currently assigned to the channel for transmitting a non-zero training signal, i.e. which are assigned to be a currently active subcarrier for the channel. The information may be stored in memory of the transceiver unit or may be generated by a computing unit or may be received from external. The modulation entity may then modulate a non-zero subcarrier symbol on each subcarrier indicated by the information and a zero subcarrier symbol on each other subcarrier. The information may include an assignment matrix as shown in FIGS. 4a and 4b and modulation may be in correspondence with any of the embodiments described with respect to FIGS. 4a, 4b, 5, 6 and 7.

The modulation entity 304 may include a FEXT training entity 308 coupled to the input 306 to receive the information indicating at least one first subcarrier to be currently assigned to the first line for transmitting a training signal on the at least one first subcarrier and to select the subcarrier symbols, i.e. a non-zero subcarrier training symbol or the zero subcarrier symbol based on the information. The subcarrier symbols are then transferred to each respective input of the frequency-time conversion entity 202 described with respect to FIG. 3.

Figure 8B:
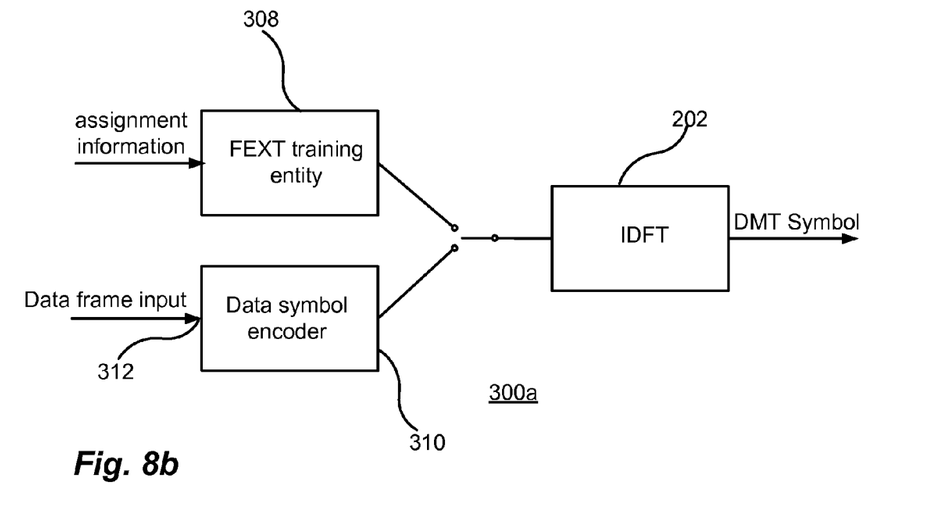

The modulation entity may further include a data symbol encoder 310 to encode data symbols during the normal data transmission in show time as shown in FIG. 8b. The data symbol encoder 310 receives at an input 312 data and encodes the data on subcarrier symbols according to predetermined constellation diagrams. The subcarrier symbols provided by the data encoder and the subcarrier training symbols provided by the FEXT training entity may be selectively provided to the frequency-time conversion entity 202 based on timing information indicating whether a training phase or a data transmission phase is currently active. For example, the FEXT training entity may be selected to provide the training subcarrier symbols (unit subcarrier symbols) or zero subcarrier symbols during the synchronization time slot of a superframe and the data encoder may be selected to provide subcarrier symbols during other time slots of the superframe.

Figure 8C:
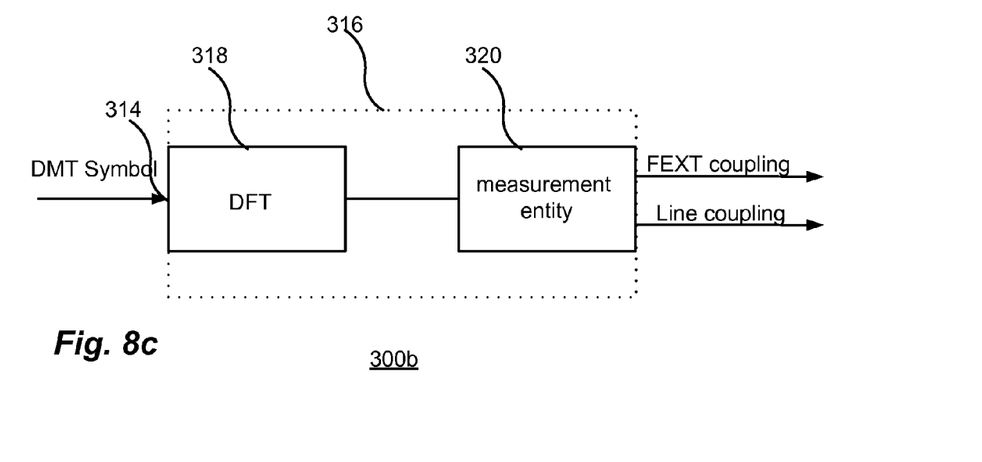
FIGS. 8c and 8d show a receiver device according to an embodiment of the present invention.

Referring now to FIG. 8c, a receiver device 300b which may be implemented in the transceiver units 104 or 108 to provide measurements of the coupling coefficients includes an input 314 to receive a training signal transmitted over a line and an entity 316 operable to demodulate the training signal. The receiver device is operable to measure FEXT coupling for each subcarrier of the plurality of subcarriers which is indicated by information to be a quiet (non-power transmitting) subcarrier for the respective line. Furthermore, line couplings are measured on each subcarrier which is indicated to be currently a quiet subcarrier for the respective line.

The entity 316 may include a time-frequency conversion unit 318 coupled to the input 314 to demodulate the received training signal and a measurement entity 320 receiving for each subcarrier the received subcarrier signal and providing FEXT and line coupling measurements.

Figure 8D:
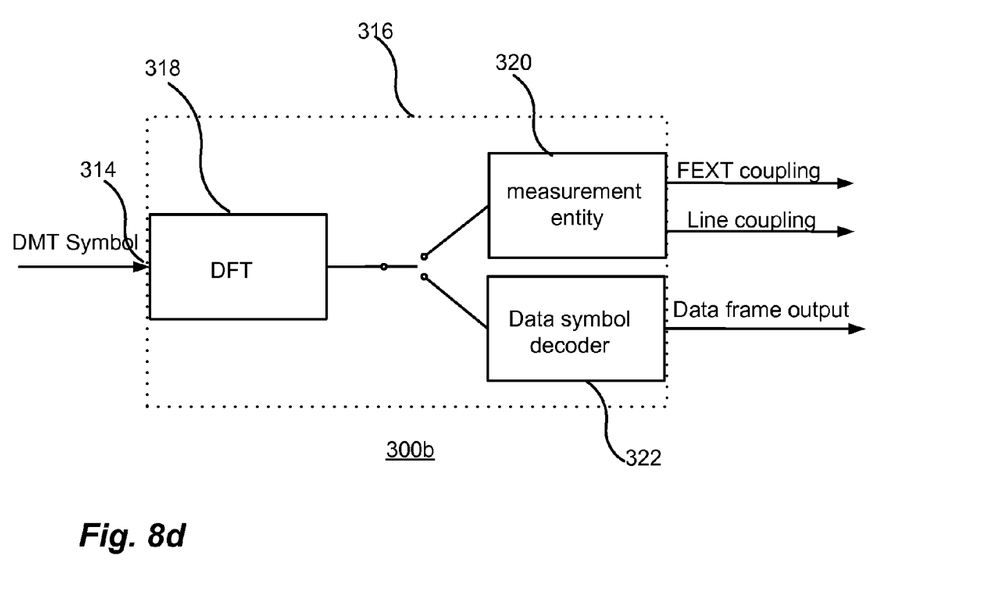

The receiver device may further comprise a data decoder 322 which is shown in FIG. 8d to decode user data transmitted in the data time slots over the line. The measurement entity 320 and the data decoder are selectively coupled to the time-frequency conversion unit 318 to allow data transfer based on timing information indicating whether a training phase or a data transmission phase is currently active.

The receiver device shown in FIGS. 8c and 8d may be implemented to operate according to any of the training signals described with respect to FIGS. 4a, 4b, 5, 6 and 7.

It is to be noted that the transmitter device 300a and receiver device 300b may be implemented as hardware circuitry or in software/firmware on a single or multiple chips. Furthermore, the data symbol encoder 310, the FEXT training entity 308, the data symbol decoder 322 and the measurement entity 320 may share same resources such as a processing unit and may be implemented in hardware, software, firmware or any combinations thereof.

The FEXT and line coupling coefficients may be directly determined from the measured receive signal for each of the subcarriers which are indicated to be currently a quiet subcarrier for the channel.

For transmitting the measured results to the unit providing compensation or precompensation information which may be for example be implemented in the management entity 112, a coupling coefficient transmission phase is provided. According to embodiments of the present invention, the receiver averages over multiple received training signals and provides the averaged measurement data in upstream direction from the transceiver units 108 back to the subscriber side, for example to a Central Office or cabinet. A dedicated data channel may be defined in upstream direction for transmitting the measurement data.

For determining the coefficients at a start-up of the system, M×N complex coefficients are to be transmitted where M is the number of lines (channels) and N is the number of subcarriers.

Considering for example, a vector group of 64 lines and 2000 subcarriers, the data amount to be transferred back is for a resolution of 16 Bit for each real coefficient 64·2000·2·16=4096000 bits.

If for the upstream transmission 2000 subcarriers are available with a bit loading of 2 bit per subcarrier, the transmission would require $$\frac{4096000}{2000 \cdot 256 \cdot 2} = 4$$

superframes for transmitting the measurement data. Assuming for example a transmission rate for the DMT symbols of 4 kbaud, the transmission time would be 0.26 seconds.

The measurement time depends on the number of repetitions required for averaging noise. When averaging for example 128 times for each coupling coefficient, a vector transmission system with a DMT symbol rate of 4 kbaud and 64 lines would need a measurement time of 2.1 seconds. For a higher DMT symbol rate, for example a DMT symbol rate of 8 kbaud, the measurement time reduces by a factor of 2 compared to the above measurement time.

Calculated measurement and transmission times for transferring the measurement data back are shown in table 1 for a 12 MHz VDSL system (4 kBaud) and a 30 MHz System (8 kBaud). In these calculations 2000 usable subcarriers for each direction and a Bitloading of 2 Bits per subcarrier symbol (4-QAM) is assumed for the transmission of the measurement data.

TABLE 1 measurement and transmission times for a VDSL vector transmission system

| | 12 MHz System (4 kBd) | | 30 MHz System (8 kBd) | |
| --- | --- | --- | --- | --- |
| M | Measurement Time [sec] | Transmission time [sec] | Measurement Time [sec] | Transmission time [sec] |
| 25 | 0.8 | 0.1 | 0.4 | 0.05 |
| 50 | 1.61 | 0.2 | 0.8 | 0.1 |
| 100 | 3.21 | 0.4 | 1.61 | 0.2 |
| 150 | 4.82 | 0.6 | 2.41 | 0.3 |
| 250 | 8.03 | 1.0 | 4.02 | 0.5 |

Referring now to the embodiment of a newly joined line described with respect to FIG. 7, the measurement time for transferring the training symbols only during the time slots of the synchronization time slots is determined by $$T_{training\_new} = (M+1) \cdot L \cdot \frac{257}{f_T}$$

where M is the number of existing lines, L is the number of DMT symbols which are used for averaging (repetition number) and $f_T$ is the DMT symbol transfer rate. The factor $$\frac{257}{f_T}$$

is introduced since 256 data symbols are transmitted between two successive synchronization time slots and the time for measurement is therefore equal to $$\frac{257}{f_T}.$$

Taking the above equation, for a system of 30 lines (M=30), a repetition number of L=8 and a DMT symbol rate of 4 kHz a measurement time of about 16 sec is calculated. It is to be noted that the measurement time may be decreased by transmitting in addition to the synchronization time slots also training symbols during one or more data time slots as mentioned already above.

For the embodiment of a newly joined line to the vector transmission system, each of the existing lines transmits measurement data back by an amount of $N \cdot 2 \cdot w_{coupling}$ where N is the number of subcarriers used in the vector transmission system and $w_{coupling}$ is the length of the coupling coefficient (resolution of real/imaginary part) and the factor 2 is introduced because real and imaginary part of the coupling coefficient is transferred back. The receiver of the newly joined line transmits measurement data by an amount of $N \cdot M \cdot 2 \cdot w_{coupling}$, i.e. M times more than each of the receivers of the existing lines.

It is to be noted that existing lines which are already transferring user data can only use a fraction of the available bandwidth for transmitting the measurement data. As the newly joined line is still in a training phase, the receiver of the new line can use the whole bandwidth of the system for transmitting the measurement data back. When the FEXT couplings are not compensated for the new line, the data rate is lower than for a system with compensated FEXT. Therefore, by transmitting the coupling coefficients related to the influence of the new line to the existing line after the end of the first training phase allows increasing the data throughput by using the already determined coupling coefficients for precompensating the signals transmitted on the existing lines for the influence of the new line. The new line may then transmit in the second training phase the measurement data with full nominal power without disturbing the existing lines which allows increased bit loading for the new line and therefore an increased data rate for the transmission of the measurement data.

Figure 9:
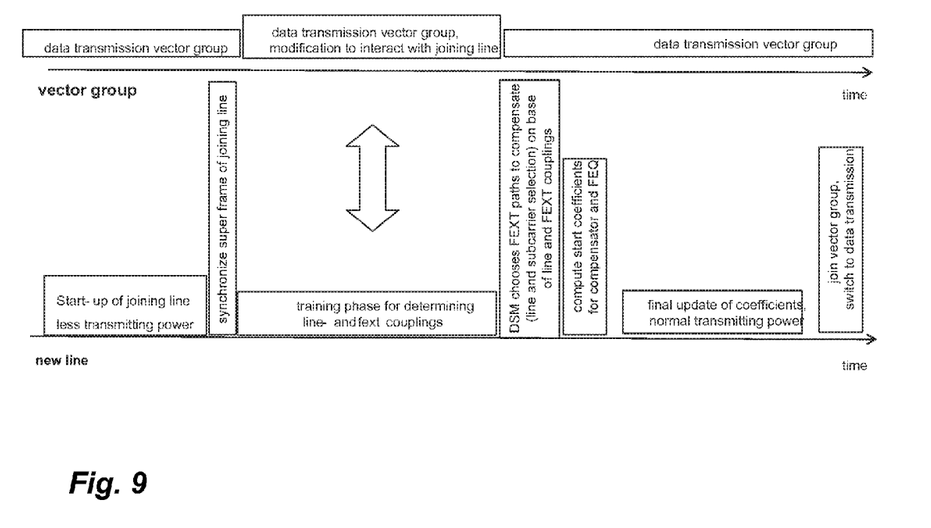
FIG. 9 shows a protocol to implement embodiments of the present invention.

An exemplary protocol which may be used for the joining of a new line is shown FIG. 9. First, the new user is connected to the line and the superframes are synchronized. During this start-up phase of the new line, the new line transmits signals with reduced power in order not to disturb the data communication on the existing lines which transmit data as before. During the start-up phase, the new line may also use only a portion of the available subcarriers (for example subcarriers in the low frequency domain) which further reduces the coupling from the new line to the existing lines. After synchronization of the superframes, the training phase starts during which for the FEXT and line couplings are determined (estimated). During this phase, the synchronization DMT symbols (synchronization words) are varied in a predetermined way as described above. As described above, for the synchronization during the training phase, two different synchronization symbols are defined. The quiet DMT symbol which modulates zeros (zero subcarrier symbols) for all subcarriers and a unit symbol which modulates a unit subcarrier symbol or any other predefined complex subcarrier symbol known to the receiver. When the unit subcarrier symbols are used, the coupling coefficients directly correspond to the measured receive signals and calculation of the coupling coefficients requires no or very low effort. In the case of other complex numbers used for modulating the subcarriers or the training signal, the measured receive signals has to be divided by the complex number but still can be determined with low computational effort.

The training phase is divided in first and second training phases as has already been described above. In the first training phase, the coupling from the new line to the existing lines is determined and in the second phase the coupling from the existing lines to the new line is determined.

Since the training signals are transferred during the synchronization time slots, the new line can transmit the training signals with full nominal power without disturbing data transfer on the existing lines.

In the second training phase, only one of the existing lines is transmitting the training DMT symbol while all other existing lines and the new line are transmitting the quiet DMT symbol during the synchronization time slot.

After the FEXT and line couplings are determined, the dynamical spectrum management (DSM) which may be implemented by management entity 112 chooses the FEXT paths for compensation on the basis of line and FEXT couplings. Then, computation of the start coefficients for compensator and the frequency equalizer starts. In the next phase, the start coefficients are adaptively tuned and after competing the adaptive tuning the coefficients for the compensator and frequency equalizer are updated to allow transmitting of data on the new line with nominal power. Finally, the new line is then joined to the vector transmission system by starting data transmission for the new line.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:

assigning each subcarrier of a plurality of subcarriers to one of a plurality of channels;

for each channel of the plurality of channels, generating a Discrete Multi-tone Transmission DMT symbol by modulating the subcarrier assigned to a respective channel with a non-zero subcarrier symbol and modulating the subcarriers which are not assigned to the respective channel with a zero subcarrier symbol, wherein each channel of the plurality of channels includes a plurality of zero subcarrier symbols; and transmitting the respective DMT symbol for each of the plurality of channels.

2. The method according to claim 1, wherein each non-zero subcarrier symbol is selected from a group of complex numbers including 1, −1, j and −j or from a group of 4-QAM symbols.

3. The method according to claim 1, further comprising:

synchronizing transmission of a superframe on each of the plurality of channels.

4. The method according to claim 1, wherein the DMT symbol of the respective channel is transmitted concurrently with the DMT symbol of each other channel.

5. The method according to claim 1, wherein each of the non-zero subcarrier symbols is different.

6. The method according to claim 5, wherein each of the non-zero subcarrier symbols is selected from a group of predetermined non-zero subcarrier symbols according to a predetermined scheme.

7. The method according to claim 1, wherein each channel of the plurality of channels includes only one non-zero subcarrier symbol.

8. A device comprising:
an output to transmit a Far End Cross Coupling FEXT training signal over a first channel; and
a modulation entity to generate the FEXT training signal, wherein the modulation entity is operable to selectively modulate a non-zero subcarrier symbol or a zero subcarrier symbol on each subcarrier of a plurality of subcarriers, the modulation entity further operable to generate the FEXT training signal by modulating a non-zero subcarrier symbol on each subcarrier indicated by information and to modulate a plurality of zero subcarrier symbols on each remaining subcarrier associated with the FEXT training signal.

9. The device according to claim 8, wherein the non-zero subcarrier symbol is selected from the group including the complex numbers 1, −1, j and −j or from the group including 4-QAM symbols.

10. A device comprising:
an input to receive a Far End Cross Coupling FEXT training signal, which includes a predetermined non-zero subcarrier symbol and a plurality of zero subcarrier symbols, that is transmitted over a first channel; and
an entity operable to demodulate the FEXT training signal and to measure FEXT coupling for each subcarrier of a plurality of subcarriers which is indicated by first information to be assigned as a currently active subcarrier for the first channel.

11. The device according to claim 10, wherein the entity is further operable to measure line coupling for each subcarrier which is indicated by the first information to be assigned as a currently quiet subcarrier for the first channel.

* * * * *